United States Patent
Pidwerbetsky

(10) Patent No.: US 7,610,015 B2
(45) Date of Patent: Oct. 27, 2009

(54) SYSTEM AND METHOD FOR COHERENT COMMUNICATION IN A NETWORK

(75) Inventor: Alex Pidwerbetsky, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 653 days.

(21) Appl. No.: 10/955,717

(22) Filed: Sep. 30, 2004

(65) Prior Publication Data

US 2006/0068705 A1 Mar. 30, 2006

(51) Int. Cl.
*H04B 7/00* (2006.01)

(52) U.S. Cl. .................. 455/41.2; 455/103; 455/517

(58) Field of Classification Search ........... 455/101, 455/103, 105, 500–528, 41.2, 450; 340/870.1–870.3
See application file for complete search history.

(56) References Cited

U.S. PATENT DOCUMENTS

| | | | |
|---|---|---|---|
| 6,785,513 B1 * | 8/2004 | Sivaprakasam | 455/63.1 |
| 6,898,430 B1 * | 5/2005 | Liberti et al. | 455/445 |
| 7,142,608 B2 * | 11/2006 | Schulze et al. | 375/260 |
| 2003/0169180 A1 * | 9/2003 | Hardman | 340/870.01 |
| 2004/0042440 A1 * | 3/2004 | McGowan | 370/345 |
| 2005/0020275 A1 * | 1/2005 | Agrawala et al. | 455/456.1 |
| 2005/0124352 A1 * | 6/2005 | Fernandez-Corbaton et al. | 455/452.2 |

* cited by examiner

*Primary Examiner*—Quochien B Vuong
(74) *Attorney, Agent, or Firm*—John Ligon

(57) ABSTRACT

A method is provided for increasing the effective transmission range for ones of a plurality of low-power transmitters arranged in an array. In particular, the low-power transmitters are arranged to simultaneously transmit a common information stream, and the transmitters are caused to transmit in a coherent manner. The resultant transmitted energy, as received at a receiver established to receive such transmissions, is thereby increased as a function of the number of operating transmitters.

14 Claims, 3 Drawing Sheets

SYSTEM AND METHOD FOR COHERENT COMMUNICATION IN A NETWORK

FIELD OF INVENTION

This invention relates to wireless communication and particularly to methods of wireless communication in respect to low-power transmitters.

BACKGROUND OF THE INVENTION

In a wireless communication environment, it is often the case that a transmitter must be operated at relatively low power. Such a constraint may be a function of limited power being available from the transmitter's power supply, such as for battery operated mobile units. In addition, the use of low transmitter output power may be required to limit interference with other signals in the same geographic proximity. While such low power operation may provide various benefits, it also has the negative consequence of significantly limiting the range at which the signal from the transmitter can be reliably received. In the art, that diminished range for a low power transmitter is ordinarily accommodated by locating the receiver(s) for the signal from such a transmitter within the limits of that diminished transmission range. For example, in a wireless communication arrangement where a number of mobile units are served by a base station, the boundary of the service area for that base station will be constrained to the range of the low-power transmitters at the mobile stations.

An alternative approach may be used in the case of a number of low-power transmitter units being positioned in a large distributed array, where each transmitter is required to periodically communicate with a central receiver. In this circumstance, the central receiver can be located proximate to one of the low-power transmitters. With such an arrangement, an outlying (i.e., distant from the transmitter located proximate to the receiver) low-power transmitter having information to send to the central receiver transmits that information to a nearby unit in the array. (It should be understood that the low-power transmitter units in the array will include an associated receiver for such inter unit communications, as well as to receive instruction from the central receiver location). If that nearby unit in the array happens to be the unit directly linked to the central receiver, it then retransmits the information from the outlying unit to the central receiver. Otherwise, the receiving nearby unit retransmits the information on to a unit in the array nearby to it, and in the direction of the unit that is directly linked to the central receiver. Such transmission and retransmission continues through multiple hops until the information reaches the unit directly linked to the central receiver, at which point it is transmitted to the central receiver. For instructions from the central receiver location to one or more of the low-power transmitter units, that process may be carried out in reverse (in the case where the transmitter associated with the central receiver is also constrained to such low-power operation).

Another technique, called Bell Labs Layered Space Time, and usually referred to by the acronym "BLAST," can also be used for increasing the useful range of low-power transmitters (or, alternately, increasing the transmission rate for such transmitters). The BLAST technique equips both the transmitter and the receiver with multiple antenna arrays and distributes the data stream for the transmitter among the multiple antennas making up the transmitter antenna array. In this arrangement, sophisticated algorithms developed for BLAST are applied at the receiver (using complex signal processing equipment to implement those algorithms) to analyze the information in the multiple transmission streams received at the receiver. Through such algorithmic processing, the BLAST approach achieves a significant improvement in throughput across the transmission channel relative to other low-power methods. Since throughput in a transmission channel is substantially a function of the transmission energy per bit seen at the receiver, the higher energy per bit provided by the BLAST technique could also provide a given throughput at a greater range than could have been achieved with classic wireless transmission systems.

Nonetheless, while BLAST can be used to improve the transmission range for a low-power transmitter, that improvement occurs at a significant cost in the required additional algorithmic analysis, and the digital signal processing components needed to carry out that analysis.

SUMMARY OF THE INVENTION

A method is provided for increasing the effective transmission range for ones of a plurality of low-power transmitters arranged in an array. In particular, the low-power transmitters are arranged to simultaneously transmit a common information stream, and the transmitters are caused to transmit in a coherent manner. The resultant transmitted energy, as received at a receiver established to receive such transmissions, is thereby increased as a function of the number of operating transmitters. Specifically, in an array comprising N operating transmitters, the transmitted energy is increased by a factor of N squared.

According to the invention, a transmitter in an array having information to transmit sends its information payload out to one or more of the other low-power transmitter units in the array, along with a request for scheduling a transmission event. When the requested transmission event has been scheduled, that information payload is sent to a central receiver by all of the low-power transmitter units in the set of one or more other transmitters in the array, along with any information payload available for transmission from other units involved in the transmission event.

In one embodiment of the invention, the coherency of the transmission is established at the receiver through processing of a channel characterization signal transmitted along with the information payload. In an alternative embodiment, a beacon generated at a central receiver location provides a reference signal for the low-power transmitter units in the array. Each transmitter unit makes its own channel measurement, and the transmitter units all transmit a common information payload at a specified time relative to the periodic beacon signal.

DETAILED DESCRIPTION OF THE INVENTION

The invention disclosed herein is directed to a method for improving the range and/or received signal quality for multiple low-power transmitters arranged to transmit information to a common receiver location. The invention is described hereafter in terms of a plurality of physically dispersed sensors (hereafter characterized as a sensor array) deployed to collect and transmit information to a central receiving location, at which such information may be processed and/or stored. It should, however, be understood that the invention is intended to apply to any arrangement of low-power transmitter units arrayed about a central receiving location. It should also be understood that each of the sensors (or, more generally, each of the low-power transmitter units) will incorporate both a low-power transmitter, such as has been described above, and a receiver adapted to receive signals transmitted in the array communications system.

As will be known to those skilled in the art of the invention, sensor arrays are found in a wide variety of applications including radar, sonar, environmental observations and microphone and seismic array applications. Although some such applications may permit a hard-wired connection between the dispersed arrays and the central receiving location, in many cases, the communications link between the sensors and the central receiver must be implemented via an RF (wireless) channel. An exemplary such wireless array configuration is shown schematically in FIG. 1, and is illustrative of the environment in which the invention is intended to be practiced.

Figure 1:
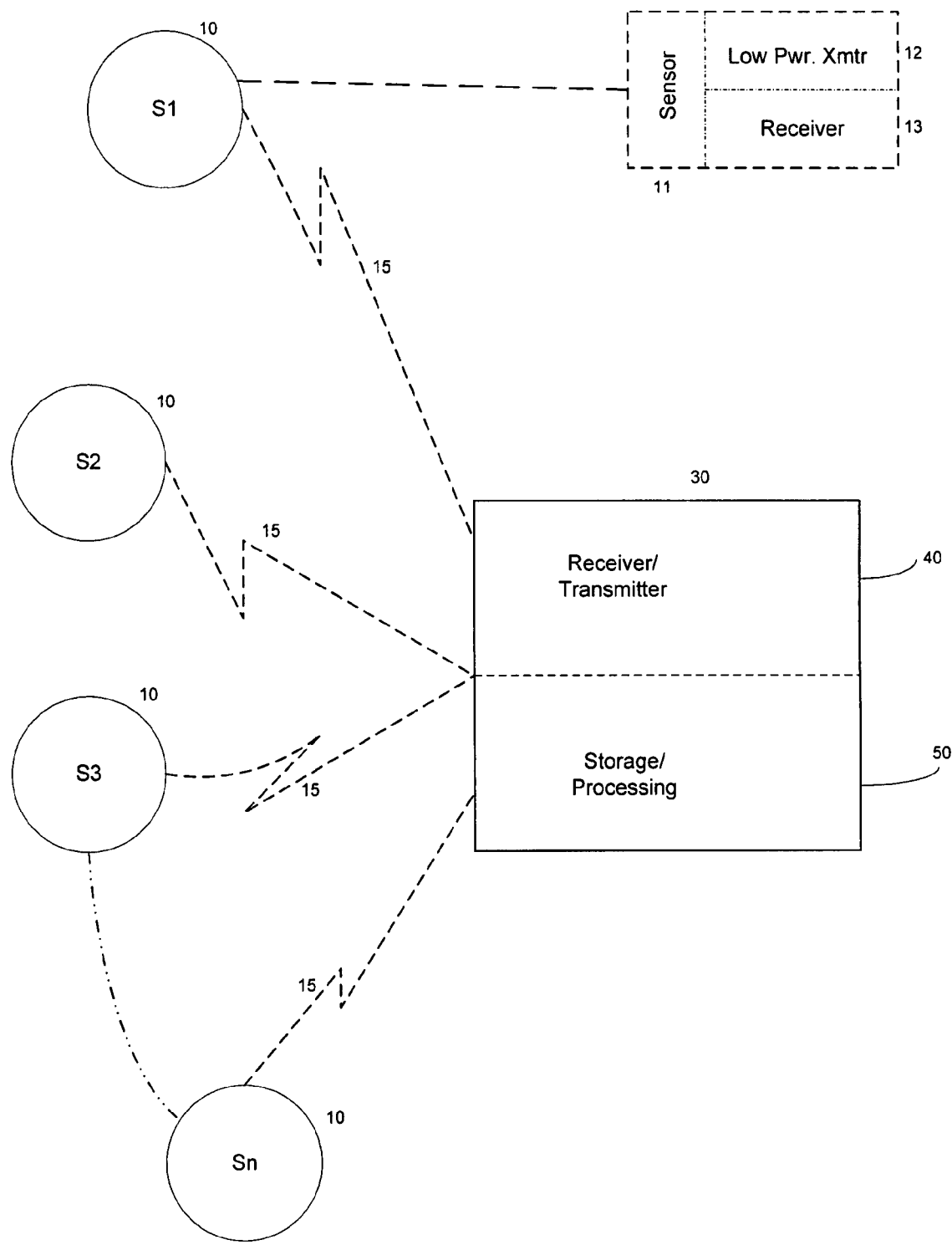
FIG. 1 provides a schematic depiction of an environment in which the method of the invention would be practiced.

With reference to FIG. 1, a plurality of sensors, $S_i$ (10) (for i=1, 2, ..., n), are illustrated each having a wireless communications link with a common receiver unit 30. In a usual case, the sensors 10 will be arranged in a manner to be physically or geographically dispersed one from another. However, that is not a necessary case, and the method of the invention is intended to be applied for any sensor array arranged for wireless communications with a central unit. As shown in the figure, the common receiver unit 30 will include a receiver/transmitter unit 40 adapted to receive communications from the sensors 10 via the wireless channels 15, and to transmit instructions or other communications to the sensors. The common receiver unit 30 may also include a storage and processing unit 50 arranged to collect and store information transmitted by the sensors, and to process such information according to a predetermined processing algorithm. Such storage and processing functions may also be implemented at a separate location from the common receiver unit, with that separate location connected to the common receiver unit location by any of various known communications media.

As shown in the inset to FIG. 1, each of the sensors, $S_i$, includes a sensing unit 11 that is arranged to provide an electrical output in response to a stimulus of a predetermined character—e.g., electromagnetic signal level, aural signal level, chemical signature, motion, vibration, pressure, environmental attributes, etc. Such sensing units are well known in the art and any of such known sensing units may be incorporated into the sensor 10 of the invention. The communications capability of a sensor 10 is implemented though Low-Power Transmitter 12 and associated Receiver 13, also shown in the FIG. 1 inset. As will be understood by those of skill in the art, Transmitter 12 and Receiver 13 could also be implemented as an integrated transceiver unit (not shown).

An important facet of the method of the invention is that of maintaining phase coherence among the signals of all of the sensing units transmitting at a given time—i.e., the maintenance of a fixed phase relationship with each other or with a third signal that can serve as a reference for each. By providing for such phase coherence among all of the transmitting sensor units 10, the plural signals from those units are advantageously combined at the central receiver 30 to result in an N-squared gain in the transmitted power of the signal. A factor of N in the N-squared resultant comes from the inclusion of the power from the N transmitting units and another factor of N comes from the coherent addition of the N signals. Since distributed sensor arrays of tens, hundreds and potentially thousands of units are within the contemplation of the art, the participation of even a small subset of them in the communications method of the invention may be expected to provide a very large gain in the received signal energy.

The phase coherency contemplated by the invention can be achieved in either of two ways. One approach is to process the received signals coherently after their transmission. In this approach, each transmitting sensor unit is arranged to transmit a channel characterization signal along with the information payload. This channel characterization signal will be known a-priori by the receiver, which searches for it by coherently processing the signals that it is receiving with a filter that is matched to the channel characterization signal. By coherently matching to the channel characterization signal, the receiver operates to establish the coherency needed to process the information payload. An example of such coherent processing, using multiple receive elements receiving multiple transmitted signals, is the technique of BLAST processing described above.

It is noted here that the coherent processing applied by the method of the invention refers to phase coherency of the carrier signal generated by the low-power transmitter units. This processing requires the carrier phase to be synchronized to some level, which is most straightforwardly achieved by phase locking the carrier to an external reference, such as the GPS timing signal. Synchronization of the transmit times can be compensated for in the receiver processing. This may be done by determining the time offsets of the different transmissions from the processing by the matched filter. Since the subsequent realignment of the data in time requires storage of the data, at least an approximate time synchronization would be advantageous. This can also be achieved through synchronization with an external reference like GPS or the intended receiver.

An alternative approach to the coherent transmission approach of the method of the invention is to establish the coherency prior to the transmission of the information payload. This approach can be implemented by the transmission of a channel characterization and synchronization signal from the ultimate receiver to all potential transmitters. The transmitters can then synchronize to the central receiver, for example, through the use of phase lock loops and clocks. If the phase synchronization is not perfect it can be compensated for in the transmission by using the channel characterization signal to measure the difference and apply the inverse to the transmission so that all of the transmissions are received coherently at the central receiver.

As noted above, for a large sensor array, it is expected that the N sensors engaged in a given transmission event will constitute less than all of the sensors in the array—i.e., the N transmitting sensors will be a subset of the full sensor population of the array. In an illustrative embodiment of the invention, the N sensors constituting a given transmitting subset are selected on the basis of relative proximity to one another. In particular, it is contemplated that information available for transmission from a given sensor unit would be disseminated to other sensor units making up the transmission subset according to a limited number of hops from the initiating sensor unit—e.g. 2, 3 or 4 hops. Thus, if sensor $S_1$ has information to transmit, its transmission subset would comprise its N−1 closest neighbors connected by H hops. It should, however, be noted that this basis for defining the scope of the N sensor units comprising a transmission subset is only exemplary, and any known basis for so defining such a transmission group, including ad hoc determination and predefined grouping, is intended to be within the scope of the invention.

Figure 2:
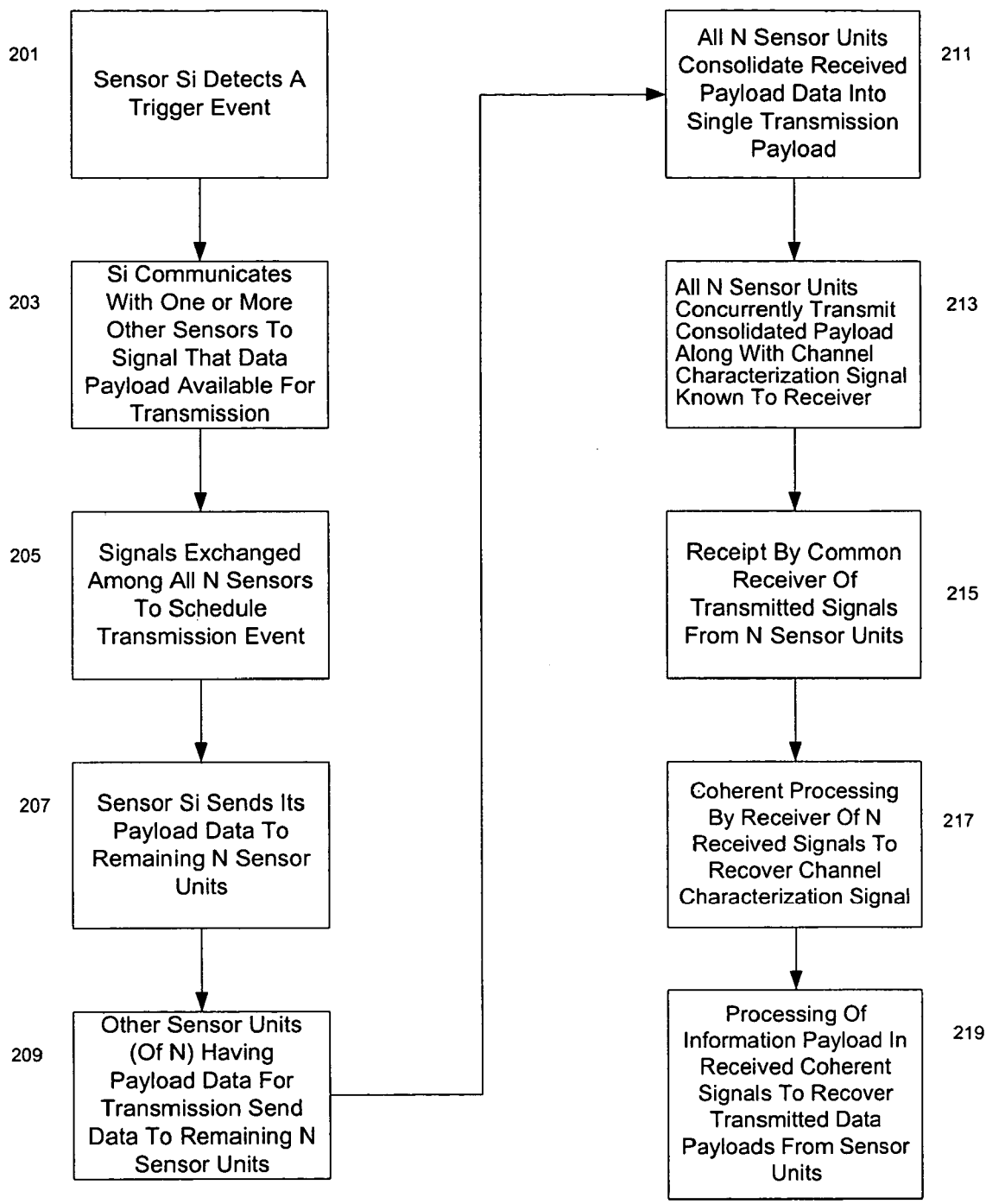
FIG. 2 is a flow chart directed to one embodiment of the method of the invention.

The process carried out by one embodiment of the invention is depicted schematically in the flow chart of FIG. 2. With reference to that figure, the process begins, at Step 201, with detection by a given sensor in the sensor array (here designated $S_i$) of a trigger event to which the sensor is programmed to respond—e.g., an electromagnetic signal in a defined range at a level exceeding the sensor's programmed threshold level. Following detection of a trigger event at Step 201, Sensor $S_i$ opens a communications link with one or more nearby sensor units, at Step 203, to signal that it has a data payload available for transmission. This information is passed on to the remaining sensors in the N-sensor transmission group—e.g., the N−1 sensors within a predetermined number of signal hops from sensor $S_i$, and, at Step 205, all of the sensors in the N-sensor group exchange signals to schedule a transmission event with the common receiver serving the sensor array. Sensor $S_i$ then sends its payload data to the one or more sensors in its near proximity, at step 207, and via retransmission from the receiving sensors, to all of the remaining sensors in the N-sensor group. If any of the remaining N−1 sensors also have payload data to transmit at the time of the scheduled transmission event, those sensors send their payload data to all of the remaining sensors in a similar manner, as indicated at Step 209.

At Step 211, all of the N sensor units operate to consolidate the payload data received from individual sensor units of the N-sensor group into a single transmission payload (for each unit). Then, at Step 213, all of the N sensor units concurrently transmit their respective consolidated payload data, along with a channel characterization signal which is known a priori to the receiver, and which may be used by the receiver to establish coherency among the received signals. The signals transmitted from the N sensors are received by the common receiver at Step 215, which receiver than operates, at Step 217 to coherently process the received signals using a filter matched to the transmitted channel characterization signal to establish the coherency needed to process the information payload. Finally, at Step 219, the received coherent signals are processed to recover the transmitted data payloads from the sensor units. Such processing may be carried out by the common receiver or by a separate processing unit.

It is to be noted that, in some cases—e.g., when the data distribution involves significant unknown latencies, it may be advantageous to carry out Step 205 (scheduling the transmission) after Step 209 (data distribution among the units).

Figure 3:
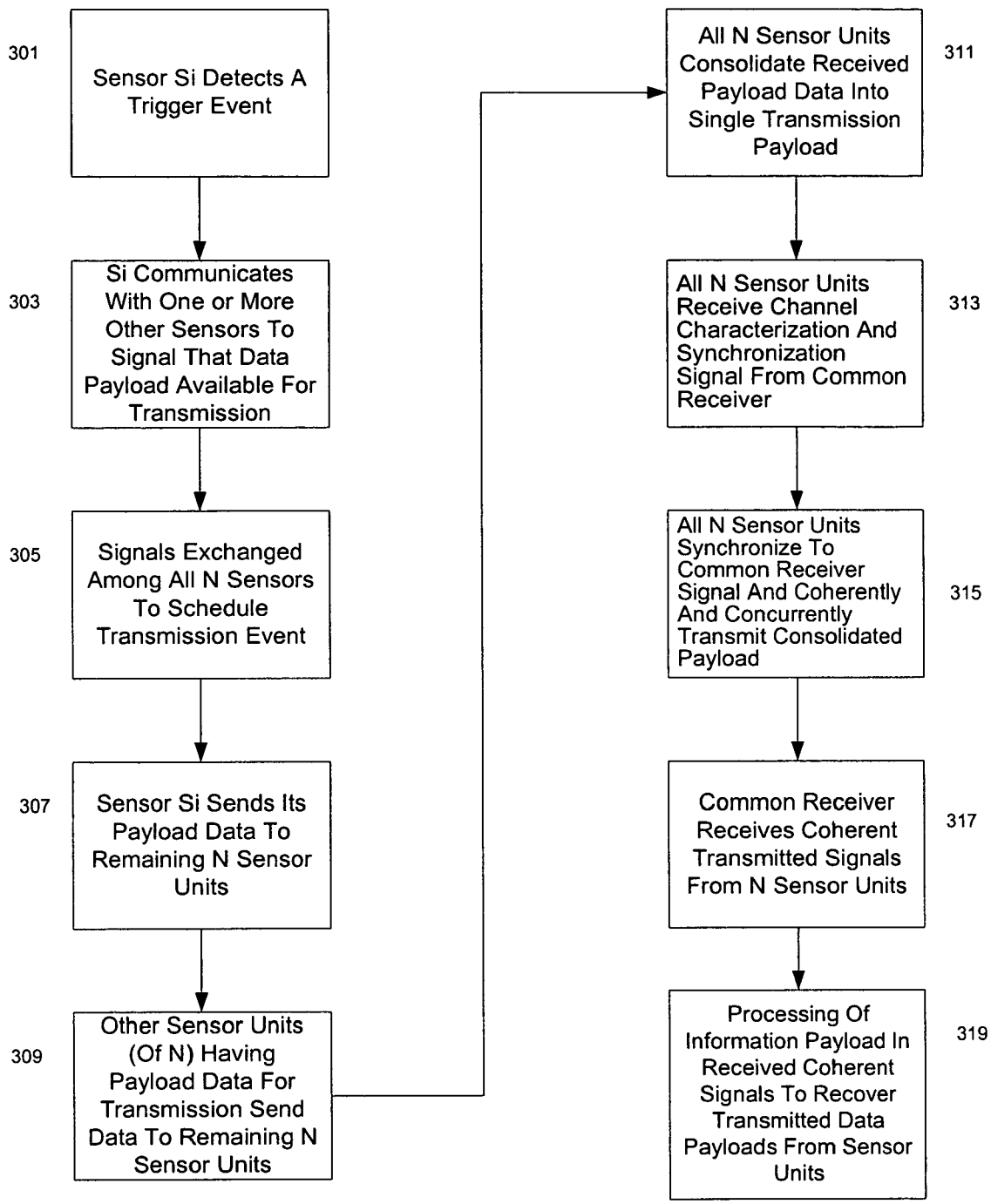
FIG. 3 is a flow chart directed to another embodiment of the method of the invention.

Another embodiment of the invention is illustrated in the flow chart of FIG. 3. This embodiment differs from the previous the-described embodiment essentially in the manner of establishing coherency among the signals transmitted from the N sensor units. Accordingly, as will be apparent from the figure, Steps 301 through 311 correspond in substance to Steps 201 through 211 of the embodiment illustrated in FIG. 2. In the embodiment illustrated in FIG. 3, the common receiver is arranged to periodically transmit a beacon containing a characterization and synchronization signal, which beacon signal can be used by the N sensor units to synchronize their respective transmissions with the common receiver. Thus, at Step 313 of FIG. 3 all of the N sensor units operate to receive the channel characterization and synchronization signal from the common receiver. Then, at Step 315, those N sensor units operate to synchronize their transmitters with the common receiver signal and to thereby coherently and concurrently transmit their respective consolidated payloads to the common receiver. Those coherent transmitted signals from the N sensor units are then received by the common receiver at Step 317. Finally, at Step 319, the received coherent signals are processed to recover the transmitted data payloads from the sensor units. As with the embodiment of FIG. 2, such processing may be carried out by the common receiver or by a separate processing unit.

Herein, the inventor has disclosed a new and improved method for signal enhancement in respect to low-power wireless transmission. Numerous modifications and alternative embodiments of the invention will be apparent to those skilled in the art in view of the foregoing description. In particular, it should be understood that, while the invention has been described in terms of transmission from sensors in a sensor array, the principles of the invention will equally apply for other forms of low-powered wireless transmission.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

What is claimed is:

1. A method for wireless transmission comprising the steps of
    organizing payload data for ones of a plurality of transmitting units into a common payload for transmission by all of the plurality of transmitting units; and
    causing the common payload data to be coherently transmitted by the plurality of transmitting units to a common receiving unit.

2. The method of claim 1 wherein the step of causing coherent transmission of data comprises the substep of:
    transmitting a channel characterization signal in conjunction with the payload data transmission from each of the plurality of transmitting units.

3. The method of claim 2 wherein the channel characterization signal enables processing at a receiving unit to provide coherency of the signals from the plurality of transmitting units.

4. The method of claim 1 wherein the step of causing coherent transmission of data comprises the substep of:
    receiving a reference signal at ones of the plurality of transmitting units whereby ones of the plurality of transmitting units transmit the common payload data in coordination with the reference signal.

5. The method of claim 4 wherein the reference signal is provided from a receiver adapted to receive signals transmitted by the plurality of transmitting units.

6. The method of claim 1 wherein the step of causing coherent transmission of data includes the further step of operating the plurality of transmitting units in synchronism.

7. The method of claim 1 wherein the plurality of transmitting units comprise sensor units of a sensor array.

8. A method for managing a plurality of wireless transmission units disposed proximate one another comprising the steps of:
    upon the availability of payload data for transmission for at least one of the plurality of wireless transmission units, signaling others of the wireless transmission units to schedule a common transmission event;
    sending payload data available for transmission from ones of the wireless transmission units having such data to all of the other wireless transmission units;
    consolidating data from the units having data into a single payload at all of the wireless transmission units; and
    coherently transmitting the single payload from all of the wireless transmission units to a common receiving unit.

9. The method of claim 8 wherein the step of coherently transmitting the single payload comprises the sub step of:
    transmitting a channel characterization signal in conjunction with the payload data transmission from each of the wireless transmission units.

10. The method of claim 9 wherein the channel characterization signal enables processing at a receiving unit to provide coherency of the signals from the wireless transmission units.

11. The method of claim 8 wherein the step of coherently transmitting the single payload comprises the sub step of:
receiving a reference signal at ones of the wireless transmission units whereby ones of the wireless transmission units transmit the payload data in coordination with the reference signal.

12. The method of claim 11 wherein the reference signal is provided from a receiver adapted to receive signals transmitted by the wireless transmission units.

13. The method of claim 8 wherein the step of coherently transmitting the single payload includes the further step of operating the plurality of wireless transmission units in synchronism.

14. The method of claim 8 wherein the plurality of wireless transmission units comprise sensor units of a sensor array.

* * * * *

UNITED STATES PATENT AND TRADEMARK OFFICE
CERTIFICATE OF CORRECTION

| | | |
|---|---|---|
| PATENT NO. | : 7,610,015 B2 | Page 1 of 1 |
| APPLICATION NO. | : 10/955717 | |
| DATED | : October 27, 2009 | |
| INVENTOR(S) | : Alex Pidwerbetsky | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 903 days.

Signed and Sealed this

Twelfth Day of October, 2010

David J. Kappos
*Director of the United States Patent and Trademark Office*